United States Patent [19]
Kollock

[11] Patent Number: 5,927,242
[45] Date of Patent: Jul. 27, 1999

[54] MARINE ENGINE WITH RECIPROCATING FORCE BALANCER

[75] Inventor: Mark A. Kollock, Fond du Lac, Wis.

[73] Assignee: Brunswick Corporation, Lake Forest, Ill.

[21] Appl. No.: 08/823,547

[22] Filed: Mar. 25, 1997

[51] Int. Cl.⁶ .................................................. F02B 75/06
[52] U.S. Cl. ........................................ 123/192.2; 74/590
[58] Field of Search .............................. 123/192.1, 192.2; 74/590

[56] References Cited

U.S. PATENT DOCUMENTS

| | | | |
|---|---|---|---|
| 779,727 | 1/1905 | Miller | 123/192.1 |
| 4,138,897 | 2/1979 | Ross . | |
| 4,481,918 | 11/1984 | Morton | 123/192.1 |
| 4,656,981 | 4/1987 | Murata et al. . | |
| 4,688,528 | 8/1987 | Nivi et al. . | |
| 4,766,857 | 8/1988 | Lainé et al. . | |
| 4,781,156 | 11/1988 | Berger et al. | 123/192.1 |
| 4,846,124 | 7/1989 | Suzuki et al. . | |
| 4,940,026 | 7/1990 | Fisher | 123/192.2 |
| 4,969,422 | 11/1990 | Ishikawa et al. . | |
| 5,189,993 | 3/1993 | Schneider | 123/192.2 |
| 5,309,877 | 5/1994 | Shigedomi et al. . | |
| 5,461,940 | 10/1995 | Morita | 123/192.2 |
| 5,755,193 | 5/1998 | Mishima | 123/192.2 |
| 5,758,615 | 6/1998 | Kreuter | 123/192.2 |

FOREIGN PATENT DOCUMENTS

| | | | |
|---|---|---|---|
| 31 20 190 | 5/1982 | Germany | 123/192.2 |

*Primary Examiner*—Erick R. Solis
*Attorney, Agent, or Firm*—Andrus, Sceales, Starke & Sawall

[57] ABSTRACT

An engine for use in a marine propulsion system for use on a boat having a force balancer mechanism for off-setting the shaking force created by the reciprocating pistons. In a two-cylinder, four-stroke marine engine, a pair of reciprocating pistons move in unison within respective cylinders. The force balancer mechanism is mounted to the rotating crankshaft such that rotation of the crankshaft results in reciprocating movement of the balance weight in a direction opposite the pair of pistons. The balance weight of the force balancer mechanism is contained within a balance weight housing formed in the engine block. The weight of the balance weight and the distance of the balance weight from the axis of rotation of the crankshaft are selected to optimally reduce the amount of shaking force in the engine.

4 Claims, 4 Drawing Sheets

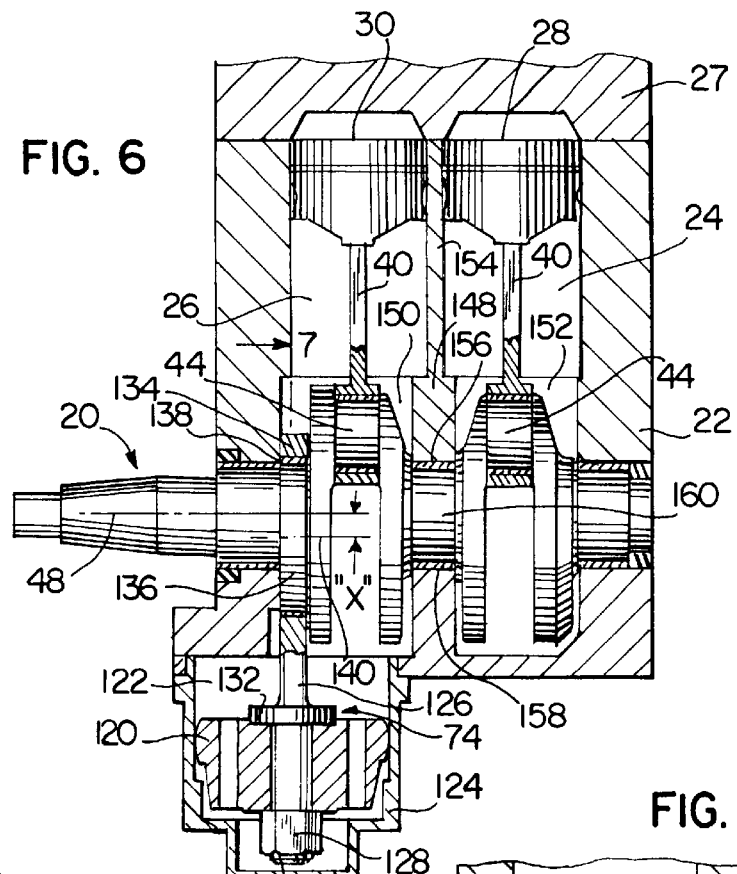
FIG. 6
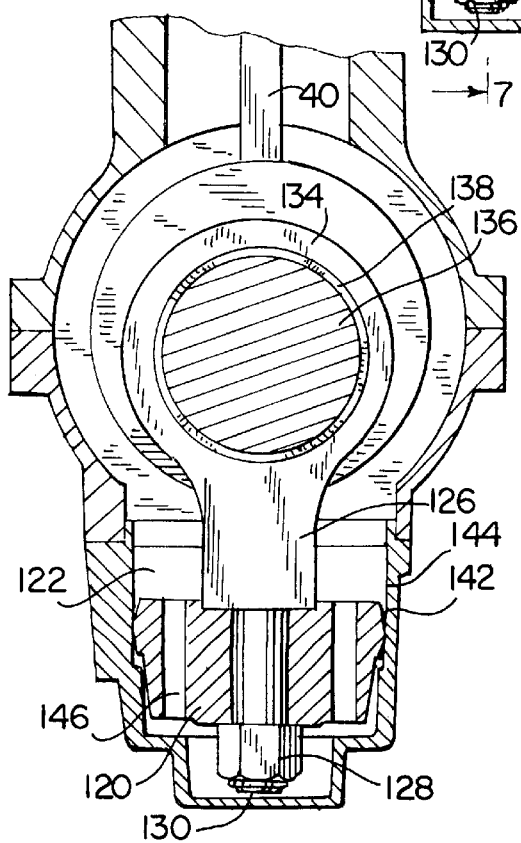
FIG. 7
FIG. 8

MARINE ENGINE WITH RECIPROCATING FORCE BALANCER

BACKGROUND OF THE INVENTION

The invention relates to the construction of an internal combustion engine for a marine propulsion system. More specifically, the invention relates to a reciprocating force balancer which is connected to the crankshaft of the marine engine and is useful in counteracting the shaking force created by a pair of engine pistons.

In a typical in-line, twin cylinder two-stroke engine, the pair of pistons are connected to a crankshaft 180° apart, such that as the first piston moves upward in its cylinder, the second piston is moving downward in its cylinder. With this type of arrangement, the inertial force created by the movement of the first reciprocating piston is canceled by the second piston that is moving in the opposite direction.

The above described 180° crankshaft creates uneven firing order in a twin cylinder four-stroke engine, since in a four-stroke engine, each piston has a power stroke only once for every two revolutions of the crankshaft. In a four-stroke engine with a 180° crankshaft, after the first piston fires, the second piston will fire after the crankshaft rotates 180°. After the second piston fires, the first piston will not fire again until the crankshaft has rotated another 540°. Thus, in a four-stroke engine with 180° crankshaft, the pair of pistons do not fire in an even pattern, which causes the engine to run in an undesirable manner.

In order to avoid uneven firing order in a twin cylinder four-stroke engine, there is a need to have a 360° crankshaft in which both the pistons move up and down in unison. In a four-stroke engine with a 360° crankshaft, after the first piston fires, the crankshaft will rotate 360° before the second piston fires, since the pair of pistons move up and down together. Once the second piston has fired, the crankshaft will rotate another 360° before the first piston fires again. Therefore, when a 360° crankshaft is used in a twin cylinder four-stroke engine, one of the pistons fires for each revolution of the crankshaft.

When a pair of pistons are connected to a 360° crankshaft to move up and down in unison, the inertial forces generated by the reciprocating movement of the combined mass of the pair of pistons creates an inertial shaking force which causes the engine to vibrate. The large magnitude of the shaking force is often difficult to isolate in the mount system of the engine. In the case of an outboard motor, the shaking force causes vibration in the tiller handle and/or the boat, making operation unpleasant.

Several methods have been developed to attempt to counteract the shaking forces created by the pair of reciprocating pistons. The first method of eliminating the shaking force is to change the firing order of the pistons such that the pistons move up and down at opposite times with respect to one another. However, as previously discussed, when the piston timing is modified as such, after the first cylinder fires there is a delay until the crankshaft rotates 540° before the next cylinder fires. Configuring a twin cylinder, four-stroke engine in this manner results in uneven firing, which is not a viable solution.

A second method of reducing or eliminating the shaking force is to construct an engine in which the pair of pistons are opposed to each other. When a pair of pistons are opposed to each other, they move in opposite directions along a single line of action. If the pistons are opposed, one of the pistons will fire for each revolution of the crankshaft. When the pair of pistons are opposed, the inertial force created by the movement of the first piston tends to counteract the inertial force created by the movement of the second piston. However, in an opposed engine, each of the cylinders extends in an opposite direction from the crankshaft, greatly increasing engine length, which typically is an undesirable result. Additionally, in an opposed engine having a single carburetor, the manifolds for the intake and exhaust are complicated compared to an in-line configuration.

A third method of reducing or eliminating the shaking force is to use a force balancer mechanism to counteract the inertial force created by the pair of pistons. Suzuki et al U.S. Pat. No. 4,846,124 discloses a balancer mechanism having a driver gear mounted to the crankshaft and operatively coupled to a pair of balancer shafts. The first and second balancer shafts rotate at the same speed as the crankshaft to counteract a portion of the inertial forces produced by the reciprocating mass of the pistons. The balancer mechanism disclosed in the U.S. Pat. No. 4,846,124 incorporates a complex series of gears and belts which combine to rotate the pair of balancing shafts. This complex arrangement requires many additional components and is therefore cost prohibitive. The complex connections between the crankshaft and the balancing shafts also require very precise manufacturing tolerances and careful gear design to avoid noisy operation. Finally, since the balance gear/shaft mechanism rotates at the engine speed, the balance mechanism does nothing to eliminate second order and higher shaking forces.

Therefore, it can be appreciated that a force balancer that can be incorporated into a marine engine, particularly a two-cylinder four-stroke engine, to balance the shaking forces created by the reciprocating pistons would be desirable. Particularly, a force balancer which consists of few parts and can be easily constructed and positioned in a marine engine would be particularly desirable.

SUMMARY OF THE INVENTION

The present invention is a force balancer mechanism that can be incorporated into a marine engine to offset the shaking forces created by the reciprocating pistons. In particularly desirable implementation, the invention is applicable to a force balancer which offsets the shaking forces created by a two cylinder in-line four-stroke marine engine.

The marine engine of the present invention includes a cylinder block which has a plurality of cylinders formed therein. Each of the cylinders includes a piston which reciprocates within the cylinder. The pair of pistons are each connected to a crank pin on a crankshaft by a separate connecting rod. In the preferred embodiment of the invention, the engine includes a pair of pistons that are configured to reciprocate in the cylinders in unison. With this timing order, the pair of reciprocating pistons create a large inertial shaking force that causes the engine to vibrate during operation.

The force balancer of the first embodiment of the invention includes a balance weight connected to a third crank pin on the crankshaft by a balance connecting rod. The third crank pin is offset 180° from the pair of crank pins on the crankshaft to which the pistons are connected. As the crankshaft rotates, the balance weight moves in a direction opposite the pair of pistons. With this arrangement, the force balancer acts to offset the shaking force created by the pair of reciprocating pistons.

In the first embodiment of the invention, the reciprocating line of action of the force balancer is centered between the line of action of each of the two reciprocating pistons. The balance weight of the force balancer is contained within a balance weight housing integrally formed with the cylinder block.

In the second embodiment of the invention, the force balancer includes a balance weight fixed to the balance connecting rod. The balance connecting rod is attached to a mounting hub formed on the crankshaft. The mounting hub is spaced axially outward from the pair of crank pins and is not centered between the crank pins. As the crankshaft rotates, the connection between the mounting hub and the balance connecting rod causes the balance weight to reciprocate within a balance weight housing. The balance weight includes a convex bearing surface that contacts the inner wall of the balance weight housing. As the balance weight reciprocates within the balance weight housing, the bearing surface remains in contact with the inner wall of the balance weight housing.

In the third embodiment of the invention, the force balancer includes a balance weight mounted for reciprocating movement along a fixed guide pin. The guide pin is securely fixed to the balance weight housing such that the guide pin is perpendicular to the crankshaft axis of rotation. As the crankshaft rotates, the balance weight reciprocates along the guide pin in order to offset the shaking force created by the pair of reciprocating pistons.

It is an object of the present invention to provide a marine engine with a force balancer mechanism, the force balancer being relatively uncomplex and the engine being small in overall size. Another object of the present invention is to provide a force balancer which reciprocates in an enclosed balance weight housing integrally formed with the engine cylinder block. Still another object of the invention is to provide an engine with a force balancer positioned such that the force balancer does not create a force couple.

Other objects and advantages of the invention may appear in the course of the following description.

BRIEF DESCRIPTION OF THE SEVERAL VIEWS OF THE DRAWINGS

The drawings illustrate the best mode presently contemplated of carrying out the invention.

In the drawings:

FIG. 3 is a sectional view taken along line 3—3 of FIG. 2 showing the position of the balance weight of the first embodiment of the invention when the pistons are in a top dead-center position;

FIG. 6 is a partial sectional side view of the pistons, crankshaft and balance weight of the second embodiment of the invention;

FIG. 7 is a sectional view taken along line 7—7 of FIG. 6 showing the connection between the balance weight and the crankshaft in the second embodiment of the invention;

FIG. 8 is a sectional view similar to FIG. 7 showing the reciprocating movement of the balance weight in the second embodiment of the invention;

DETAILED DESCRIPTION OF THE PREFERRED EMBODIMENT

Figure 1:
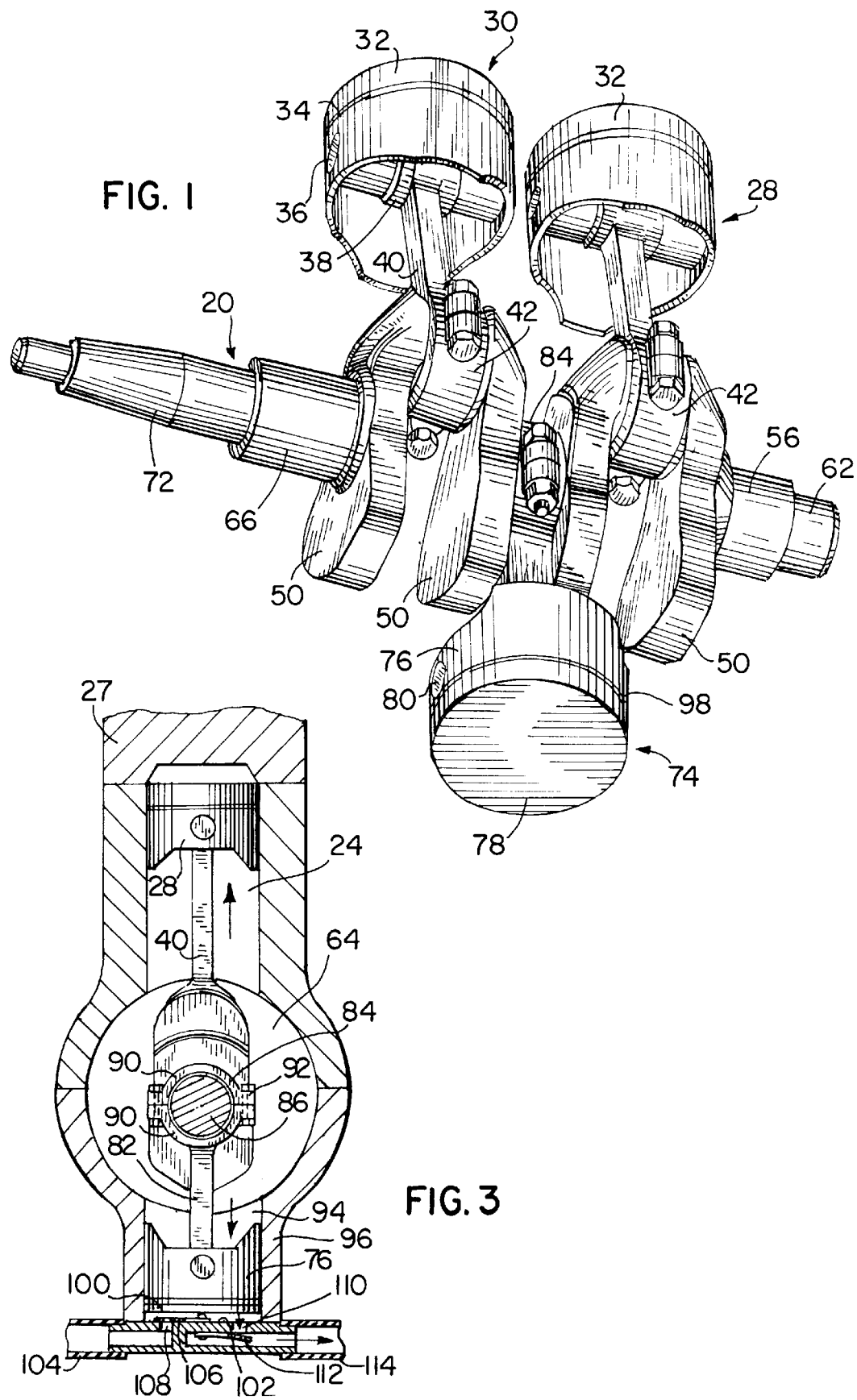
FIG. 1 is a perspective view of the crankshaft and force balancer, including a balance weight, of the first embodiment of the invention.
Figure 2:
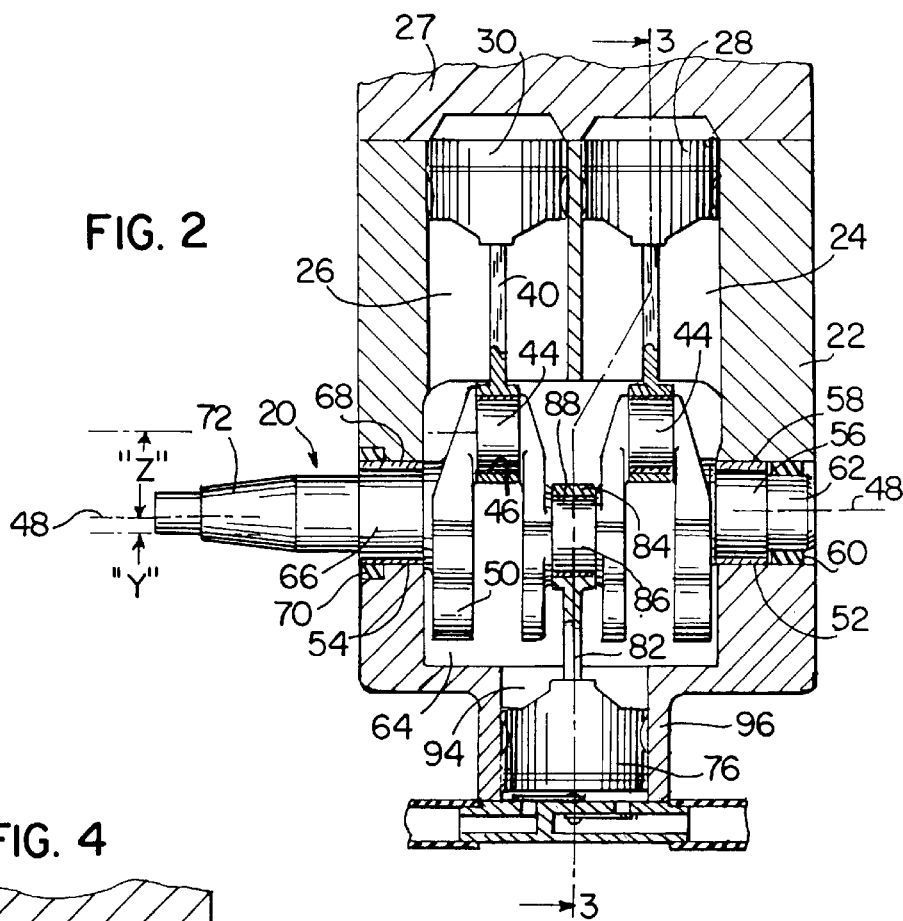
FIG. 2 is a partial sectional side view of the crankshaft and balance weight of FIG. 1 shown as mounted in an engine block.

Shown in FIGS. 1–4 is the first embodiment of the invention, a force balancer for an outboard motor or marine propulsion device having a plurality of reciprocating pistons. Illustrated in FIGS. 1 and 2 is a crankshaft 20 for a two cylinder, four-stroke engine, including a cylinder block 22 having a pair of cylinders 24 and 26. Each of the cylinders 24 and 26 is defined at the top end by a cylinder head 27. A first piston 28 is slidably disposed in cylinder 24, while a second piston 30 is slidably disposed in the second cylinder 26. Each of the pistons 28 and 30 has a piston head 32, including a piston ring 34 surrounding its outer circumference. The pistons 28 and 30 each have a respective piston pin or wrist pin 36 connected to the small end 38 of a connecting rod 40 in a known manner. The connection between the piston pin 36 and the small end 38 of the connecting rod 40 permits pivoting rotation of the piston head 32 with respect to the connecting rod 40 in a known manner. The big end 42 of each connecting rod 40 is connected to the crankshaft 20 for converting the linear movement of the pistons 28 and 30 into rotary movement of the crankshaft 20.

Referring specifically to FIG. 2, the crankshaft 20 includes a pair of crank pins 44 onto which the big end 42 of the connecting rods 40 are mounted by a suitable bearing 46. Bearing 46 is pressed between the inner surface of the big end 42 and the crank pin 44 to permit rotation of the big end 42 about the crank pin 44. As can be appreciated in FIGS. 1 and 2, both of the crank pins 44 are at the same angular position on the crankshaft 20 such that both of the pistons 28 and 30 reciprocate in unison when the crankshaft 20 rotates. Thus, both of the pistons 28 and 30 are in the top dead-center position, shown in FIG. 2, at the same time.

The crankshaft 20 is referred to as a 360° crankshaft since the crank pins 44 are at the same angular position. The timing of the four-stroke engine is set such that one of the pistons 28,30 fires for every 360° rotation of crankshaft 20. When the pair of pistons 28 and 30 begin to effect linear reciprocating movement in a known manner, the crankshaft 20 starts to rotate about its axis of rotation 48. Since both of the pistons 28 and 30 reciprocate together, an inertial force (shaking force) is produced in the same direction in which the pistons 28 and 30 are moving. A pair of crankshaft counterweights 50 are attached to axially opposite sides of the crankshaft 20 from the crank pins 44 to aid in balancing the rotating portion of the connection rods 40. While the series of counterweights 50 act to balance the rotating portion of the connecting rods 40, the counterweights 50 fail to counteract the inertial forces produced by the reciprocating pistons, such that the reciprocating pistons 28 and 30 produce a rather substantial shaking force which results in engine vibration.

In a two cylinder in-line engine having a 360° crankshaft without a force balancer, the mass of the counterweights 50 could be increased to eliminate a portion of the fore-aft shaking force. However, by increasing the amount of counterweight 50, the engine will then experience an increase in side-to-side shaking. Thus, a trade-off is made in the direction of shaking force present in the engine.

The engine crankshaft 20 is mounted for rotation in the engine block 22 by a pair of bearings 52 and 54. The first bearing 52 is positioned between a mounting hub 56 on the crankshaft 20 and a mounting aperture 58 formed in the engine block 22. The first bearing 52 supports the crankshaft 20 in the mounting aperture 58 and allows the mounting hub 56 to rotate with respect to the fixed engine block 22. A sealing gasket 60 surrounds an extending portion 62 of the crankshaft 20 and engages the inner surface of the mounting aperture 58 to prevent fluid contained within crankshaft chamber 64 from exiting through the mounting aperture 58.

The second bearing 54 is positioned between a second mounting hub 66 on the crankshaft 20 and a second mounting aperture 68 formed in the cylinder block 22. The second bearing 54 supports the crankshaft 20 in the second mounting aperture 68 and allows the mounting hub 66 to rotate with respect to the fixed engine block 22. A second sealing gasket 70 surrounds the outer portion of the second bearing 54 and provides a fluid tight seal between the crankshaft chamber 64 and the exterior of the cylinder block 22.

Crankshaft 20 further includes an extending portion 72 which extends past the outer wall of the cylinder block 22. The extending section 72 is connected to the timing belt through a timing gear, each of which are not shown but are well known in the relevant art.

To aid in counteracting the shaking force created by the pair of reciprocating pistons 28 and 30, a force balancer 74 is attached to the rotating crankshaft 20. In the first embodiment of the invention shown in FIGS. 1–4, the force balancer 74 includes a balance weight 76, preferably in the shape of a piston. Balance weight 76 includes a piston head 78 that is similar to the pair of piston heads 32. In the preferred embodiment of the invention, the balance weight 76, shown in FIGS. 1–4, is constructed of cast iron, while the the pair of pistons 28 and 30 are aluminum. The balance weight 74 includes a wrist pin 80 which provides rotatable connection between the piston head 78 and the small end (not shown) of the balance connecting rod 82 in a manner similar to that described with regard to pistons 28 and 30. The large end 84 of the balance connecting rod 82 is connected to a third crank pin 86 formed on the crankshaft 20. A bearing 88 is positioned between the large end 84 and the third crank pin 86 to facilitate rotation of the large end 84 with respect to the third crank pin 86. In another embodiment, bearing 88 could be eliminated if the balance connecting rod 82 is constructed of aluminum, such that the balance connecting rod 82 directly contacts the third crank pin 86. The large end 84 of the balance connecting rod 82 includes a pair of semi-circular connecting portions 90, FIG. 3, that are joined by a series of connectors 92 to provide secure attachment between the balance connecting rod 82 and the third crank pin 86.

As can be seen in FIG. 2, the center of the third crank pin 86 is offset from the axis of rotation 48 of crankshaft 20 and is positioned on the crankshaft 20 such that its radial position is 180° from the pair of standard crank pins 44. Thus, when the third crank pin 86 is located in its lowermost position, the pair of crank pins 44 are in their uppermost position, as illustrated in FIG. 2. The center of the third crank pin 86 is located a distance "y" below the center line 48 of the crankshaft 20, while the center line of the crank pins 44 is located a distance "z" above the crankshaft center line 48 when the crankshaft 20 is viewed in the position shown in FIG. 2. The significance of the distance below or above the center line 48 of each of the crank pins 44 and 86 will be discussed in greater detail below.

Figure 4:
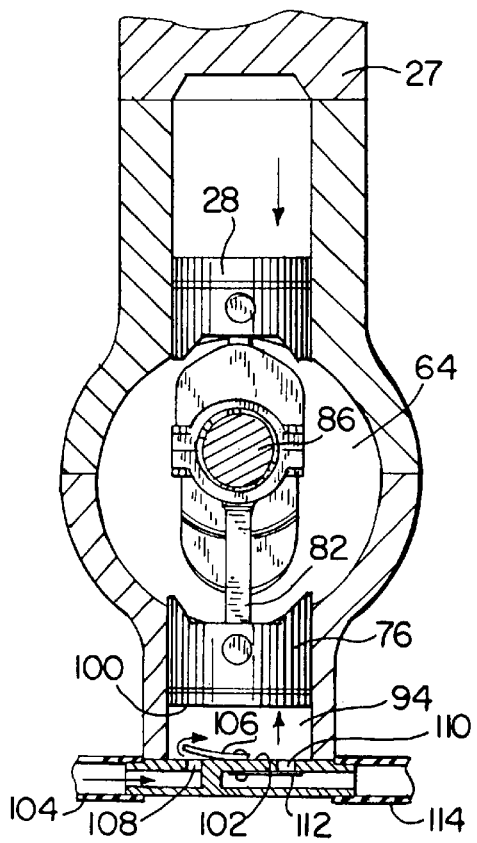
FIG. 4 is a sectional view similar to FIG. 3 showing the position of the balance weight of the first embodiment of the invention when the pistons are in the bottom dead-center position.

The balance weight 76 is contained within a balance weight chamber 94 defined by a balance weight housing 96. Balance weight housing 96 is integrally formed with the cylinder block 22 and extends outwardly in a direction away from the crankshaft 20. The internal diameter of the balance weight chamber 94 closely corresponds to the outer diameter or the piston head 78 such that the balance weight chamber 94 guides the movement of the balance weight 76. As the crankshaft 20 rotates, the balance weight 76 reciprocates within the balance weight chamber 94. FIG. 3 shows the top dead-center position of the balance weight 76, while FIG. 4 shows the bottom dead-center position of the balance weight 76. Thus, as the pair of pistons 28 and 30 move upward (FIG. 3), the balance weight 76 moves downward to offset the inertial force created by the pistons 28 and 30, as indicated by the arrows of FIG. 3.

In the first embodiment of the invention, the balance connecting rod 82 is positioned half-way between the pair of connecting rods 40 for pistons 28 and 30. When the balance connecting rod 82 is centered between the two connecting rods 40, the opposing forces created by the pair of pistons 28 and 30 and the balance weight 76 do not generate a force couple.

Figure 5:
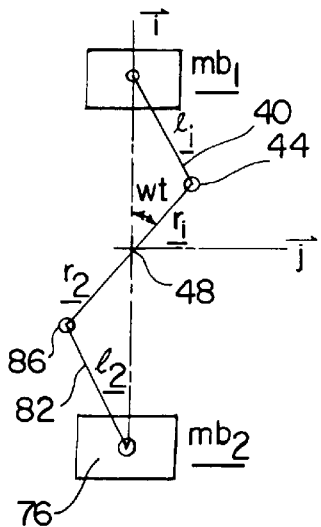
FIG. 5 is a schematic representation of the engine pistons and balance weight illustrating the variables used in calculating the shaking force.

In order to cancel out the shaking force created by the pair of reciprocating pistons 28 and 30, various design characteristics of the force balancer 74 must be chosen. With reference being made to FIG. 5, the shaking force of the engine is defined by the following simplified equation in which harmonics greater than the second order are assumed to be small and thus dropped out:

$$\overline{F} = \left[ m_{b_1} r_1 w^2 \cos(wt) + m_{b_1} r_1 w^2 \frac{r_1}{l_1} \cos(2wt) - m_c r_1 w^2 \cos(wt) - m_{b_2} r_2 w^2 \cos(wt) - m_{b_2} r_2 w^2 \cos(wt) - m_{b_2} r_2 w^2 \frac{r_2}{l_2} \cos(2wt) \right] \overrightarrow{i} - [m_c r w^2 \sin(wt)] \overrightarrow{j}$$

With respect to equation 1, the variables are shown in FIG. 5 to facilitate understanding and are defined as follows:

$m_{b1}$=combined reciprocating mass of both pistons
$m_{b2}$=reciprocating mass of balance weight/piston
$l_1$=length of std. connecting rods
$l_2$=length of balance connecting rod
$r_1$=crank radius (std. crank pins)
$r_2$=balance crank radius
wt=crank angle
w=engine speed
$m_c$=crank counter weight @ crank radius As can be understood with reference being made to FIGS. 1–4, $r_1$ is the distance "z" between the center line 48 of the crankshaft 20 and the center line of each crank pin 44, $r_2$ is the distance "y" between the center line 48 of the crankshaft 20 and the center of the third crank pin 86, and $m_c$ is the combined weight of the counterweights 50 above that needed to balance the crankshaft and the rotating portion of the connecting rods 40 at a distance "z" from the center line 48.

To eliminate all shaking forces, $m_{b_1}r_1$ should equal $m_{b_2}r_2$ and $m_c$=zero, such that:

$$\vec{F} = \left[ m_{b_1} r_1 w^2 \frac{r_1}{l_1} \cos(2wt) - m_{b_2} r_2 w^2 \frac{r_2}{l_2} \cos(2wt) \right] \vec{i} = \left[ \left( \frac{r_1}{l_1} - \frac{r_2}{l_2} \right) m_{b_1} r_1 w^2 \cos(2wt) \right] \vec{i}$$

Thus, if $r_1/l_1=r_2/l_2$ the shaking force will be completely eliminated. While the above-identified relationships between the reciprocating masses, lengths of connecting rods and crank radii are most desirable, packaging constraints in the design of a marine propulsion engine often prevent such relationships. Therefore, to reduce the amount of shaking force, the relationships between the above-identified variables are optimized. For example, in the first embodiment shown in FIGS. 1–4, $mb_1$=0.366 kg, $mb_2$=0.6466 kg, $r_1$=21.2 mm, $r_2$=12 mm, $l_1$=79 mm, and $l_2$=74 mm, such that the force balancer 74 eliminates approximately 70% of the shaking force.

In the first embodiment shown in FIGS. 1–4, the balance weight 76 includes a piston ring 98 around the outer circumference of the piston head 78. The piston ring 98 interacts with the inner wall of balance weight chamber 94 to provide an air-tight seal between the piston head 78 and the balance weight chamber 94. Thus, as the balance weight 76 reciprocates in the balance weight chamber 94 due to the rotation of crankshaft 20, the balance weight 76 acts as an air pump.

During the upstroke of balance weight 76 and hence the downstroke of piston 28, the increasing area between the piston face surface 100 and the outer wall 102 of the balance weight chamber 94 causes air to be drawn in from an air inlet hose 104 through a flap valve 106 covering air inlet aperture 108. During the downstroke of the balance weight 76 and hence the upstroke of piston 78, FIG. 3, the decreasing area between the piston face 100 and the outer wall 102 causes air to be forced out an air outlet 110 through flap valve 112. Air exiting the flap valve 112 is forced through an air outlet hose 114. The pressurized air in air outlet hose 114 can be used for a variety of purposes, such as pressurizing the air intake system, providing pressurized air for direct injection systems, or adding air to the exhaust to improve combustion of the remaining fuel to lower emissions.

A second embodiment of the present invention is shown in FIGS. 6–8 with corresponding reference numerals being used to facilitate understanding. In the second embodiment in the invention, the force balancer 74 includes a balance weight 120 contained within a balance weight chamber 122. The balance weight chamber 122 is defined by balance weight housing 124 which is connected to the cylinder block 22. The balance weight 120 is securely connected to a balance connecting rod 126 that passes through the center of the balance weight 120. In the preferred embodiment of the invention, the balance weight 120 is formed from cast iron. An attachment nut 128 engages a threaded portion 130 of the balance connecting rod 126 to securely hold the balance weight 120 against a flange 132 on the balance connecting rod 126. The big end 134 of the balance connecting rod 126 surrounds a balance weight mounting hub 136 formed on the crankshaft 20. A bearing 138 is disposed between the big end 134 of the balance connecting rod 126 and the balance weight mounting hub 136 to permit rotational movement of the big end 134 with respect to the balance weight mounting hub 136.

As can be seen in FIG. 6, the center line 140 of balance weight mounting hub 136 is located a distance "x" from the axis of rotation 48 of the crankshaft 20. Like the third crankpin 86 of the first embodiment, the mounting hub 136 is positioned on the crankshaft such that its center line 140 is 180° from the pair of standard crankpins 44 on the crankshaft 20. Thus, as the reciprocating pistons 28 and 30 move within the pair of cylinders 24 and 26, the rotation of crankshaft 20 causes the balance weight 120 to reciprocate in the opposite direction within the balance weight chamber 122.

The balance weight 120 includes a convex bearing surface 142 surrounding its perimeter (FIGS. 7–8). The convex bearing surface 142 contacts the inner wall 144 of the balance weight chamber 122 to guide the reciprocating movement of the balance weight 120. As the balance weight 120 reciprocates, the balance weight 120 rocks within the balance weight chamber 122, as shown in FIG. 8. This rocking movement of the balance weight 120 causes the balance weight 120 to be angled (FIG. 8) at times within the balance weight chamber 122. The convex bearing surface 142 allows the balance weight 120 to rock within the balance weight chamber 122 while still maintaining contact with the inner wall 144, thus preventing the balance weight 120 from causing noise during operation.

The convex bearing surface 142 is properly radiused such that as the balance weight 120 reciprocates, the bearing surface 142 remains in contact with the inner wall 144 of the balance weight housing 124. In the preferred embodiment of the invention, the convex bearing surface 142 is coated with a wear resistant material, such as Teflon®. By coating the convex bearing surface 142 with a wear resistant material, the balance weight 120 is better able to withstand the constant moving contact with the inner wall 144.

The balance weight 120 further includes a series of air passages 146 between its upper and lower surfaces. The air passages 146 prevent a build-up of air pressure either above or below the balance weight 120 as the balance weight reciprocates within the balance weight chamber 122.

Referring again to FIG. 6, it can be seen that a solid center web 148 extends between a pair of crankshaft chambers 150 and 152. The center web 148 is joined to a center divider 154 that separates the pair of cylinders 24 and 26. The center web 148 includes a support aperture 156 which receives a bearing 158 surrounding a center section 160 of the crankshaft 20. The bearing 158 further allows the crankshaft 20 to rotate within the mounting aperture 156.

The balance weight mounting hub 136 on the crankshaft 20 is axially spaced from the pair of crank pins 44, such that the reciprocating line of action of the force balancer 74 is no longer centered between the line of action of the pair of reciprocating pistons 28 and 30. In this configuration, the center of gravity of the balance weight 120 is no longer positioned between the cylinders 24 and 26, resulting in a small force couple when the engine is operating that is not present in the first embodiment shown in FIGS. 1–4. The balance weight 120 is positioned as such in order to make way for other engine components, such as the shift mechanism (not shown). While the force balancer 74 shown in FIGS. 6–8 is not the optimum configuration to eliminate the shaking force, since it introduces a force couple, the force balancer 74 of the second embodiment greatly reduces the shaking force, as compared to an engine operating without a force balancer 74.

To determine the amount of shaking force present in the second embodiment shown in FIGS. 6–8, equation 1 is again used. In equation 1, the balance crank radius, $r_2$, is represented by the distance "x" as shown in FIG. 6. The remaining variables are the same as previously described, such that equation 1 can be optimized through selection of the weight of balance weight 20 and the length of the balance connecting rod 126.

Figure 9:
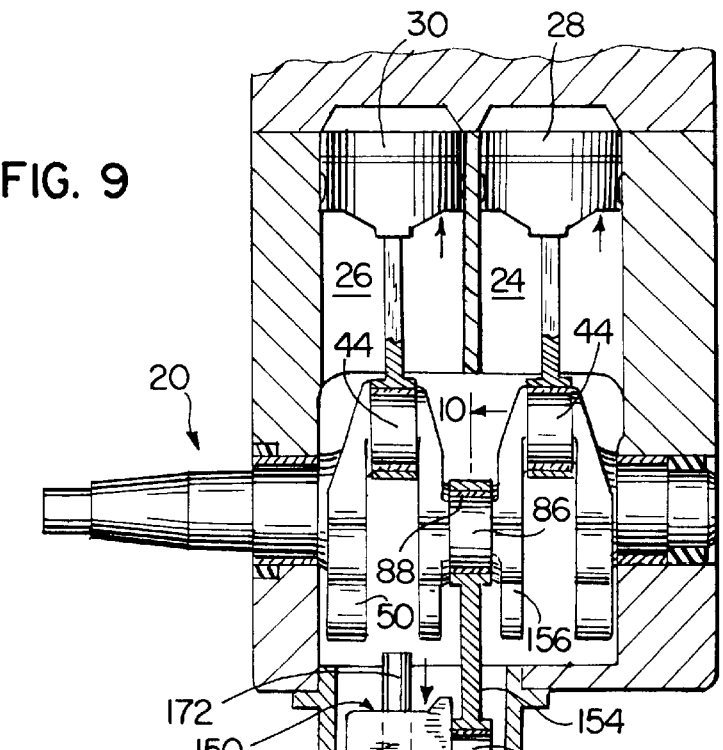
FIG. 9 is a partial sectional side view showing the pistons, crankshaft, and balance weight of the third embodiment of the invention, further illustrating the position of the balance weight when the pistons are in the top dead-center position.
Figure 10:
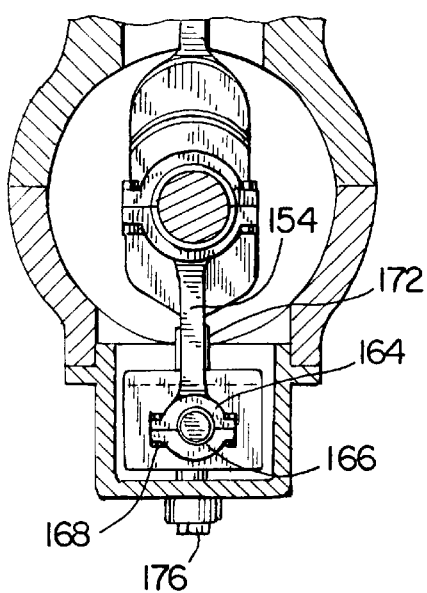
FIG. 10 is a sectional view taken along line 10—10 of FIG. 9 showing the connection between the balance weight and the crankshaft in the third embodiment of the invention.
Figure 11:
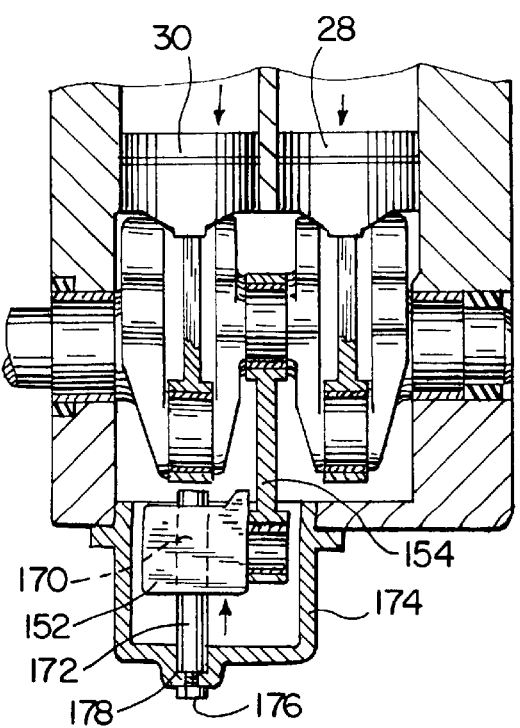
FIG. 11 is a partial side sectional view similar to FIG. 9 showing the position of the balance weight when the pistons are in the bottom dead-center position.

The third embodiment of the invention is shown in FIGS. 9–11 with corresponding reference numerals being used to facilitate understanding. The crankshaft 20 shown in FIGS. 9–11 is similar to that shown in FIGS. 1–4. Particularly, the crankshaft 20 in FIG. 9 includes a third crank pin 86 positioned between the pair of crank pins 44. Unlike the embodiment shown in FIGS. 1–4, the third embodiment of FIGS. 9–11 includes a third type of force balancer 150. The force balancer 150 includes a balance weight 152 connected to a balance connecting rod 154. The big end 156 of the balance connecting rod 154 is fixed to the third crank pin 86. Bearing 88 is positioned between the big end 156 and the third crank pin 86, as was previously discussed, to permit rotational movement of the big end 156 with respect to the third crank pin 86. The second end 158 of the balance connecting rod 154 is attached to a projecting portion 160 of the balance weight 152. A bearing 162 is positioned between the second end of the balance connecting rod 154 and the projecting portion 160, such that the balance connecting rod 154 can rotate with respect to the balance weight 152.

The second end 158 of the balance connecting rod 154 is defined by a pair of semi-circular connecting portions 164 and 166, FIG. 10, joined to each other by a pair of connectors 168. The connectors 168 provide a secure connection between the second end 158 of the balance connecting rod 154 and the projecting portion 160.

Referring to FIGS. 9 and 11, the balance weight 152 includes an internal passageway 170 which receives a guide pin 172. Guide pin 172 preferably has a circular outer diameter which corresponds to the circular internal passageway 170 in the balance weight 152. As can be understood by examining FIGS. 9 and 11, as the crankshaft 20 rotates, the balance weight 152 reciprocates in a direction opposite the pistons 28 and 30 along the guide pin 172 to counteract the shaking force created by the pair of reciprocating pistons 28 and 30. The guide pin 172 is secured to the balance weight housing 174 by a connector 176. The bottom end of guide pin 172 is seated in a recess 178 contained in the inside wall of the balance weight housing 174 to provide secure support for the guide pin 172.

As with the second embodiment shown in FIGS. 6–8, the line of action of counterweight 152 is no longer centered between the pair of pistons 28 and 30. Thus, while the balance weight 152 negates much of the shaking force produced by the pair of reciprocating pistons 28 and 30, the location of the counterweight results in a small force couple. As with the second embodiment, the counterweight is located off-center in order to permit the positioning of other engine components, not shown. It is understood that if space requirements are no longer an issue, the balance weight 152 would be positioned directly below the center line between pistons 28 and 30, such that no force couple was created.

In deciding on the mass of counterweight 152 and the length of balance connecting rod 154, equations 1 and 2 are again used in the same manner as with the first embodiment to optimize the amount of shaking force eliminated by the force balancer 150.

It is recognized that various equivalents, alternatives and modifications are possible within the scope of the appended claims, and that the embodiments shown and described are preferred or exemplary embodiments.

I claim:

1. An engine comprising:
   an engine block having a pair of cylinders;
   a pair of pistons, each reciprocal in a respective cylinder;
   a crankshaft rotatably supported in said engine block, and rotatable about a rotation axis, said crankshaft having first and second axially spaced radially offset crank pins;
   a pair of piston connecting rods, each connected between a respective piston and crank pin;
   a balance weight housing extending radially from said engine block;
   a balance weight reciprocal in said balance weight housing;
   a radially offset balance weight mounting hub on said crankshaft and axially outward from said crank pins;
   a balance weight connecting rod connected between said balance weight and said balance weight mounting hub.

2. The invention according to claim 1 comprising a main bearing rotationally mounting said crankshaft to said engine block at a location axially between said first and second crank pins and radially offset therefrom, and wherein said balance weight mounting hub is on the opposite axial side of said first crank pin from said main bearing.

3. The invention according to claim 1 wherein said pistons have a center of mass along an intermediate radial center line between said pistons, and wherein the radial center line of the center of mass of said balance weight is axially offset from said intermediate radial center line.

4. The invention according to claim 1 wherein said balance weight has distally oppositely facing first and second surfaces, said first surface facing toward said crank shaft, said second surface facing away from said crankshaft, said balance weight having one or more air passages therethrough between said first and second surfaces.

* * * * *